United States Patent
Kohri et al.

(10) Patent No.: US 8,995,140 B2
(45) Date of Patent: Mar. 31, 2015

(54) ELECTRONIC DEVICE HAVING JACK

(75) Inventors: Katsushige Kohri, Osaka (JP); Kensaku Matsuda, Osaka (JP)

(73) Assignee: KYOCERA Corporation, Kyoto (JP)

( * ) Notice: Subject to any disclaimer, the term of this patent is extended or adjusted under 35 U.S.C. 154(b) by 177 days.

(21) Appl. No.: 13/457,102

(22) Filed: Apr. 26, 2012

(65) Prior Publication Data

US 2012/0275125 A1    Nov. 1, 2012

(30) Foreign Application Priority Data

Apr. 26, 2011   (JP) ................. 2011-097712

(51) Int. Cl.
*H05K 5/00* (2006.01)
*H04M 1/02* (2006.01)

(52) U.S. Cl.
CPC ........... *H04M 1/026* (2013.01); *H04M 1/0235* (2013.01); *H04M 1/0277* (2013.01)
USPC ................. 361/752; 361/679.01; 361/679.02; 361/679.55; 361/679.56

(58) Field of Classification Search
USPC ............. 361/679.01, 679.02, 679.55, 679.56; 345/168, 169
See application file for complete search history.

(56) References Cited

U.S. PATENT DOCUMENTS

2010/0053851 A1 * 3/2010 Bernstein et al. ........ 361/679.01
2011/0279987 A1   11/2011 Otani

FOREIGN PATENT DOCUMENTS

| JP | 2000-295133 A | 10/2000 |
| JP | 2010-177880 A | 8/2010 |
| JP | 2010-226531 A | 10/2010 |

OTHER PUBLICATIONS

An Office Action; "Notice of Reasons for Rejection," issued by the Japanese Patent Office on Sep. 30, 2014, which corresponds to Japanese Patent Application No. 2011-097712 and is related to U.S. Appl. No. 13/457,102; with English language concise explanation.

* cited by examiner

*Primary Examiner* — Robert J Hoffberg
*Assistant Examiner* — Hung Dang
(74) *Attorney, Agent, or Firm* — Studebaker & Brackett PC

(57) ABSTRACT

An electronic device having a jack hole to expose a jack, includes a circumferential wall is formed in a case to surround the jack, wherein two gap portions of the circumferential wall are formed to pass from the jack hole to the inside of the case, and wherein one gap of the two gap portions is smaller than the other gap of two gap portions.

4 Claims, 8 Drawing Sheets

ELECTRONIC DEVICE HAVING JACK

CROSS-REFERENCE TO RELATED APPLICATION

This application claims priority from Japanese Patent Application No. 2011-097712 filed on Apr. 26, 2011, the entire subject matter of which is incorporated herein by reference.

TECHNICAL FIELD

This disclosure relates to an electronic device having a jack for insertion of a device such as an earphone plug or a USB plug.

BACKGROUND

An electronic device such as portable phones having a music playback function has been used, and a user can an insert earphone plug into earphone jack of the main body of the electronic device, thereby capable of listening to music through earphones.

For example, if these electronic devices are used in the rain, water may enter the electronic devices from the jack hole and if the entered water reaches electronic components of a circuit board in the electronic device, specifically, a high-voltage circuit unit, the electronic component may be malfunctioned and an electrical short circuit may occur. For this reason, the jack holes have been covered with water-resistant cap. However, in order to insert the earphone plug into the jack hole, it is required to remove the water-resistant cap, and then this is trouble to the user.

For this reason, it has been proposed to provide a water-resistant structure such as a structure attaching a waterproof sheet to an outer circumferential wall of an earphone jack (refer to JP-A-2000-295133). According to this water-resistant structure, it is possible to further suppress water entered into a jack hole from infiltrating into a device.

However, in an electronic device having a waterproof structure according to the related art, the number of components increases, and it is required such as process of attaching a waterproof sheet to the outer circumferential wall of an earphone jack in an assembling process, and thus the cost increases.

In order to solve this problem, it can also be considered to form a waterproof wall at a cabinet configuring the main body of the electronic device, so that the waterproof wall surrounds the earphone jack. This waterproof wall has a water-resistant structure by assembling the cabinet. In this case, some assembly errors may occur, and thus it is difficult to implement a sufficiently water-resistant structure.

With taking into consideration the above, this disclosure provides at least a configuration to suppress water from infiltrating into a main body of an electronic device having a jack through a jack hole of the electronic device, without increasing the number of components.

An electronic device, which has a jack hole to expose a jack, of this disclosure comprises a circumferential wall is formed in a case to surround the jack. Two gap portions of the circumferential wall are formed to pass from the jack hole to the inside of the case, and one gap of the two gap portions is smaller than the other gap of two gap portions.

In the above-mentioned electronic device of this disclosure, in a case where water enters into the inside of the earphone jack from the jack hole and two gap portions have the same conditions except that the two gap portions have different gaps, the entered water is drawn to the one gap portion having a small gap by a capillary phenomenon, and then the entered water is held in the small gap portion or flows into the case through the small gap portion, according to the amount of water.

Here, the capillary phenomenon unlikely occurs in the other gap portion having a large gap, and thus the water is rarely drawn to the large gap portion.

Since the water passing through the one gap portion easily flows in a flow direction when passing the gap portion, that is, from the gap portion toward one side wall, a flow path directed from the gap portion to the one side wall, for example, a flow path bypassing a high-voltage circuit unit provided in the case is formed.

Here, the magnitude relation between the gaps of the one gap portion and the other gap portion is unlikely reversed even if any assembly errors exist in the case. Therefore, the above-mentioned bypassing flow path is always formed, regardless of assembly errors of the case.

Therefore, the water entered into the jack hole is unlikely to reach the high-voltage circuit unit in the case, and thus occurrence of an electric short circuit in the high-voltage circuit unit is suppressed.

Further, the circumferential wall surrounding the jack may be formed, for example, integrally with the holder member for holding the jack, or the case.

According to the electronic device of this disclosure, it is possible to suppress the infiltration of water into the electronic device without an increase in the number of components, by actively controlling a infiltration path of water, not by configuring a water-resistant structure by a circumferential wall surrounding the jack.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, a sliding-type communication terminal of an embodiment of this disclosure will be described in detail with reference to the accompanying drawings.

Figure 1:
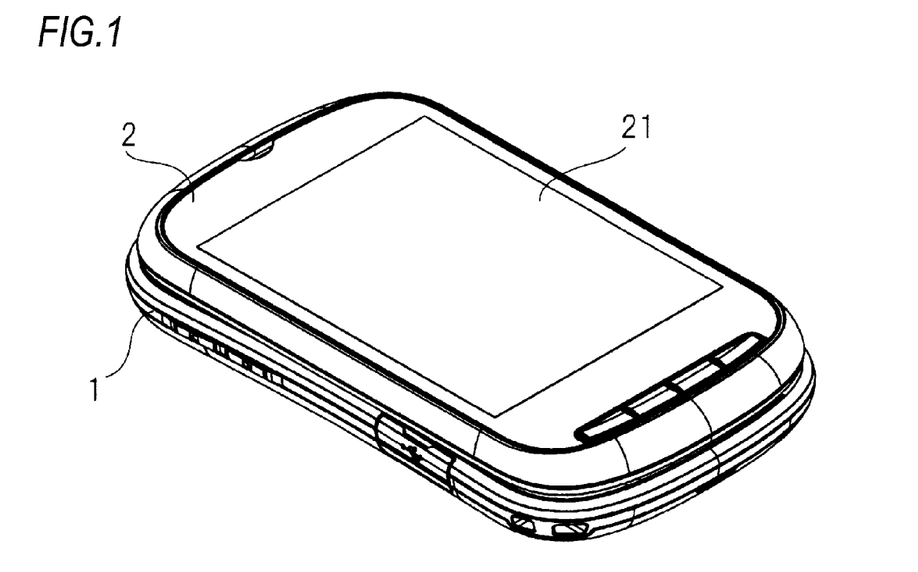
FIG. 1 is a perspective view illustrating an open state of a sliding-type communication terminal according to an embodiment of this disclosure.
Figure 2:
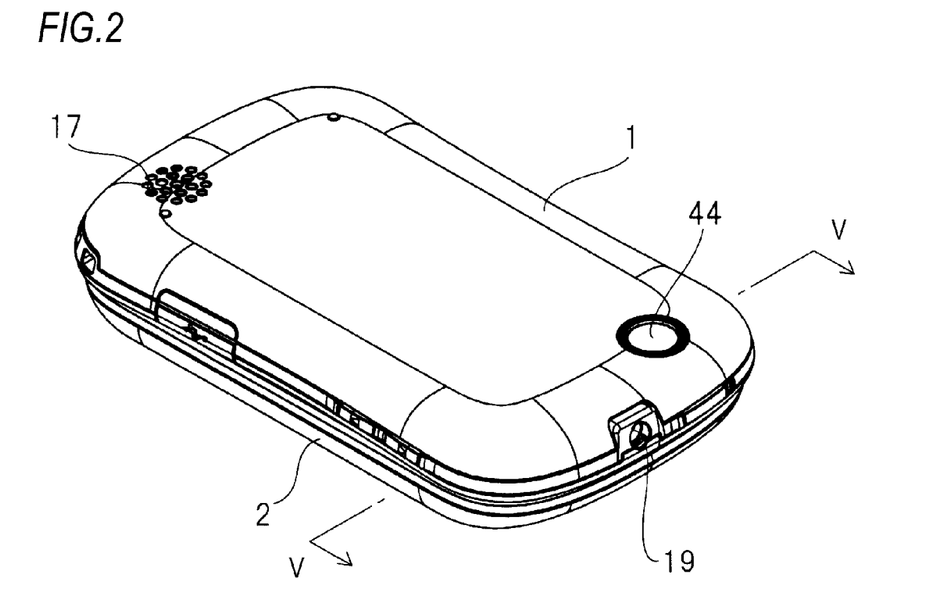
FIG. 2 is a perspective view illustrating the open state of the reversed sliding-type communication terminal.
Figure 3:
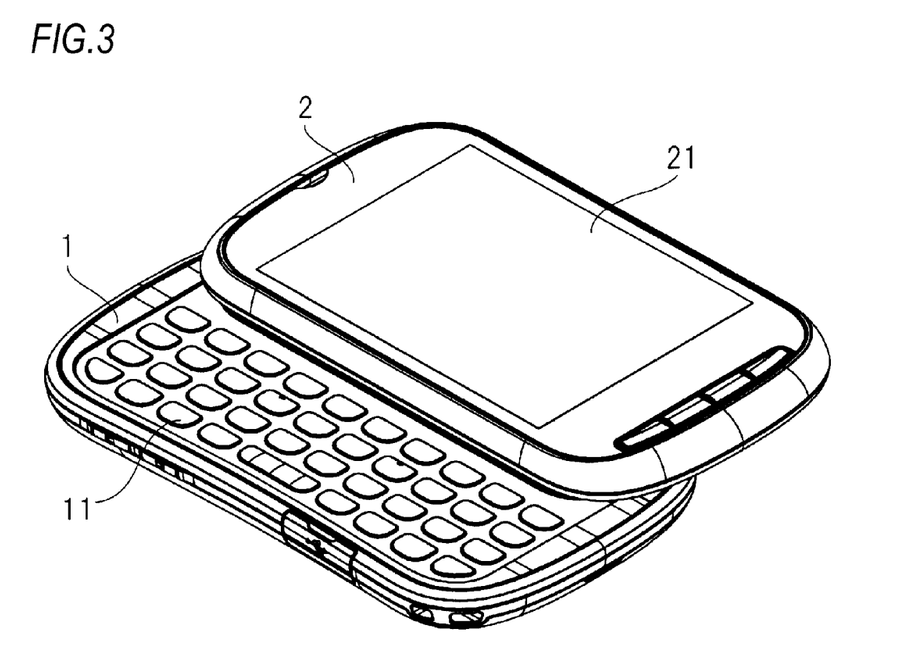
FIG. 3 is a perspective view illustrating a closed state of the sliding-type communication terminal.
Figure 4:
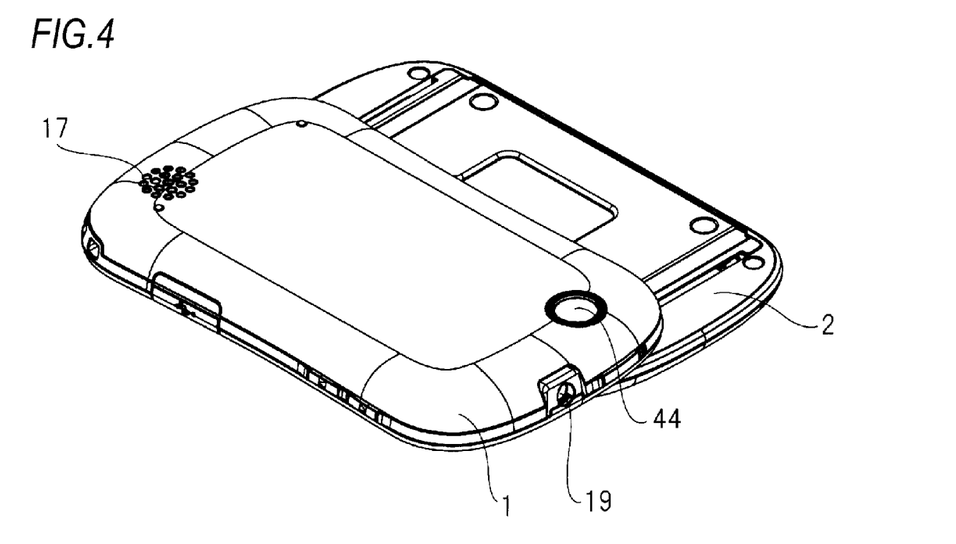
FIG. 4 is a perspective view illustrating the closed state of the reversed sliding-type communication terminal.

The sliding-type communication terminal according to the embodiment of this disclosure includes a first case 1 and a second case 2 that are coupled to be slidable with respect to each other, as shown in FIGS. 1 to 4. Further, as shown in FIG. 3, the sliding-type communication terminal includes a plurality of operation keys 11 formed at the front face of the first case 1, and a screen 21 formed at the front face of the second case 2.

As shown in FIG. 2, at the rear face of the first case 1, a shooting window 44 is made of a transparent resin plate, and sound emission holes 17 are formed.

Figure 5:
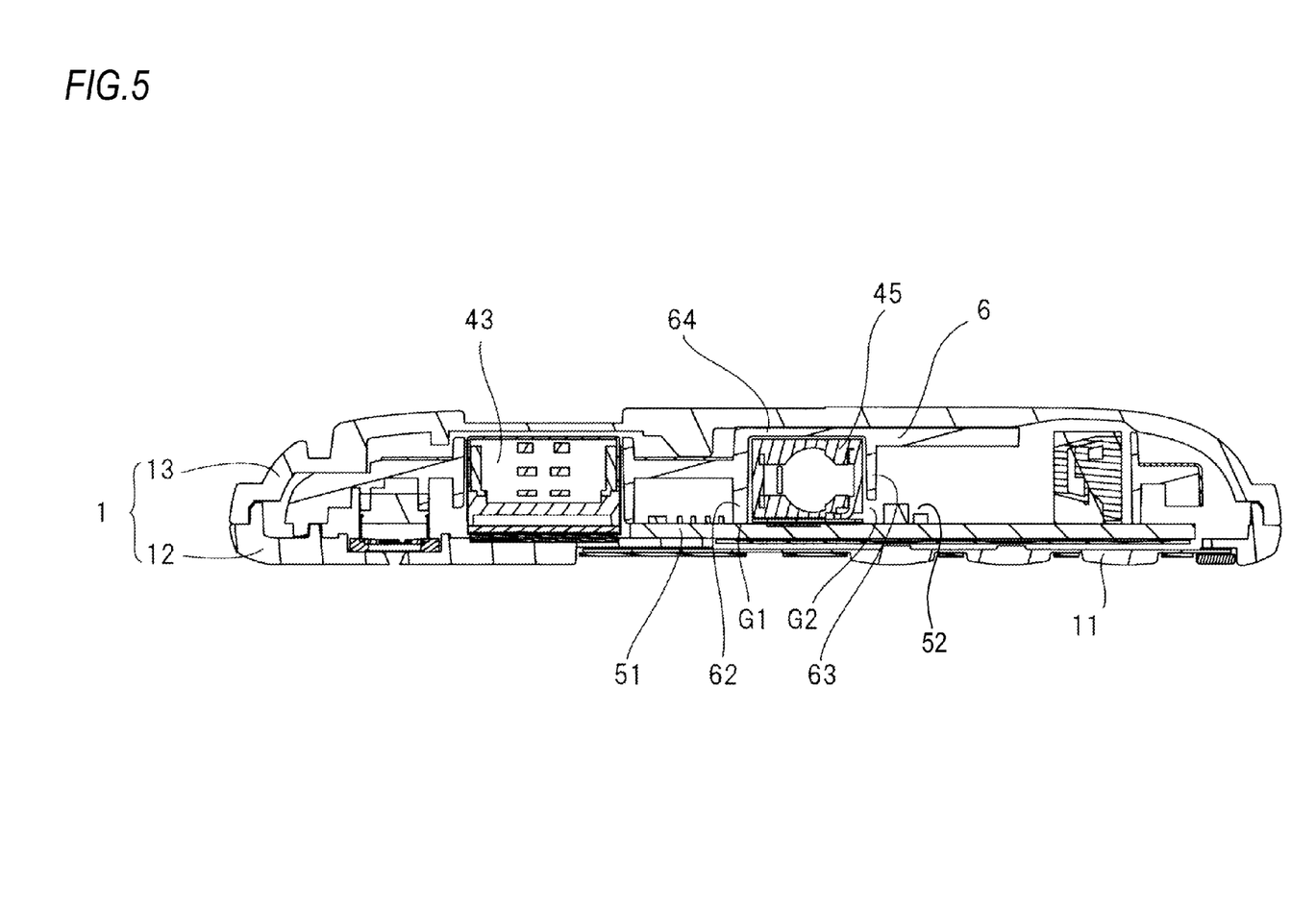
FIG. 5 is a cross-sectional view taken along a line V-V of FIG. 2.
Figure 6:
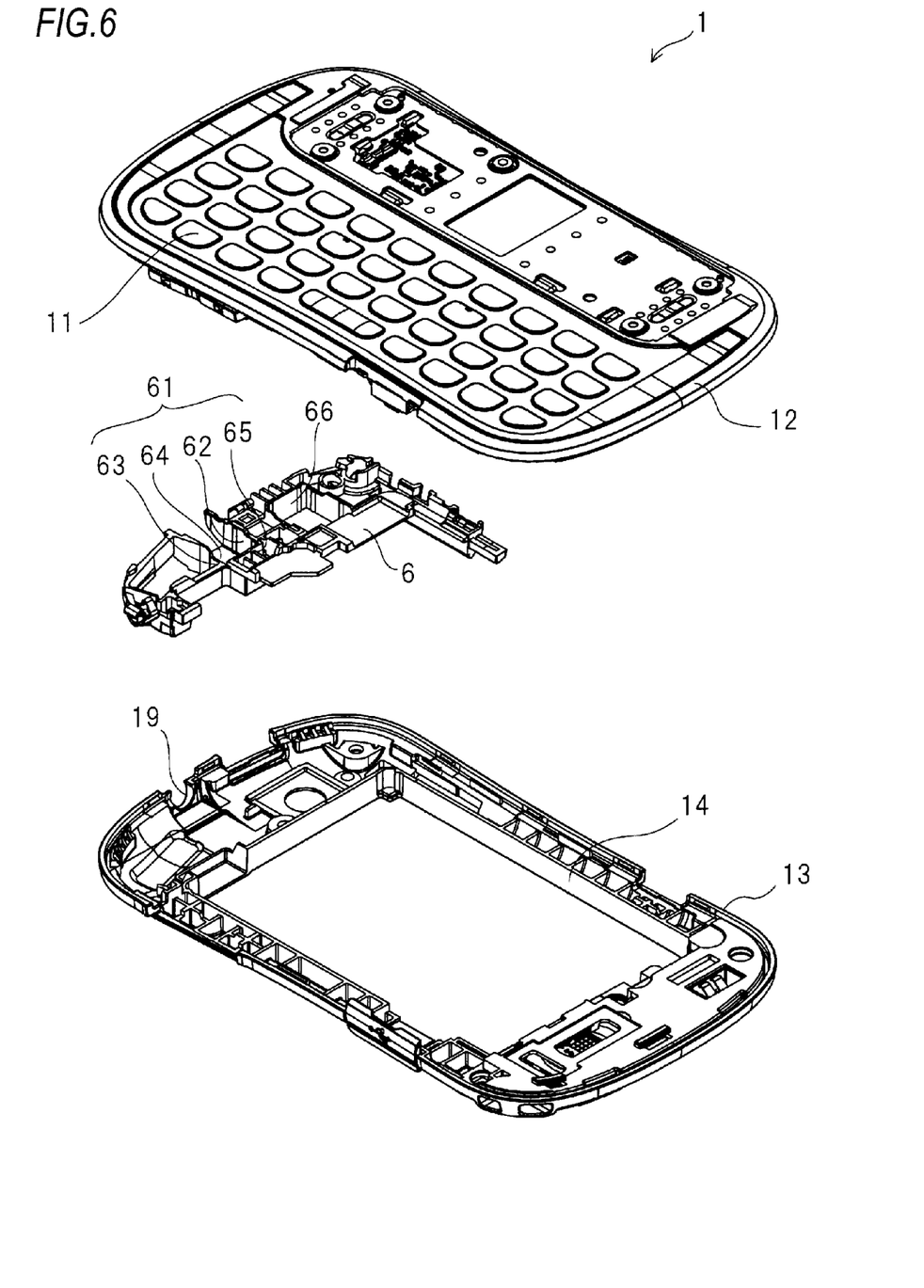
FIG. 6 is an exploded perspective view of a first case configuring the sliding-type communication terminal.

As shown in FIGS. 5 and 6, the first case 1 is configured by coupling a front cabinet 12 and a back cabinet 13, which are made of a synthetic resin.

Figure 7:
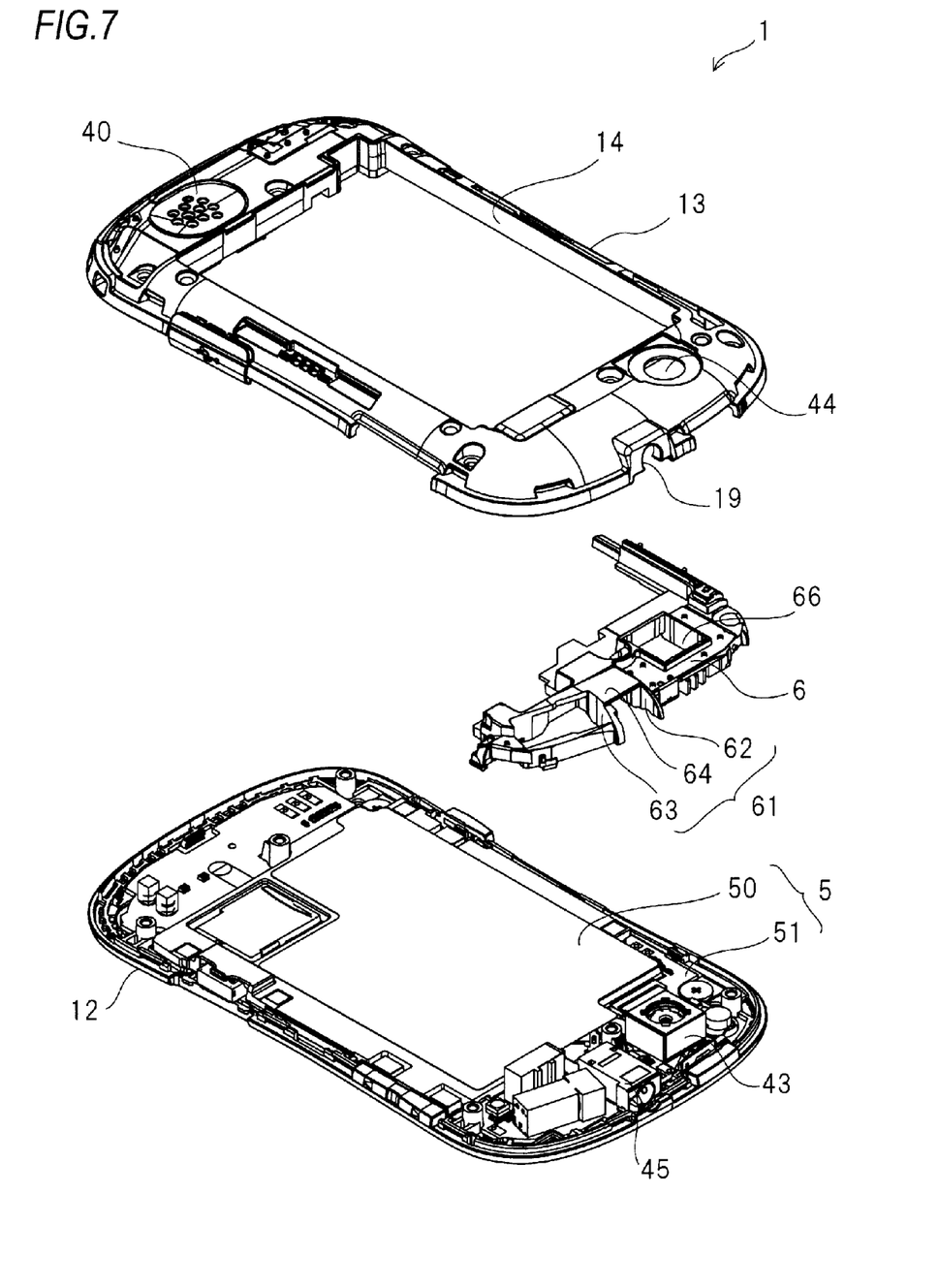
FIG. 7 is an exploded perspective view of the reversed first case of FIG. 6.

As shown in FIG. 7, in the front cabinet 12, a board assembly 5 configured by a circuit board 51 and a shielding plate 50, and a camera 43 are provided. An earphone jack 45 is disposed on the circuit board 51.

The back cabinet 13 has an opening 14 for a battery containing space at its center portion. A speaker 40 is disposed at a position facing the sound emission holes 17 by one side of the opening 14, and the shooting window 44 is disposed at a position facing the camera 43 near the other side of the opening 14.

Further, a jack hole 19 for exposing the earphone jack 45 is formed at the back cabinet 13.

On the surface of the circuit board 51, a holder member 6 made of a synthetic resin is installed to surround the camera 43. The holder member 6 includes a jack holding part 61 for holding the earphone jack 45, and a camera holding part 66 for holding the camera 43.

Figure 9:
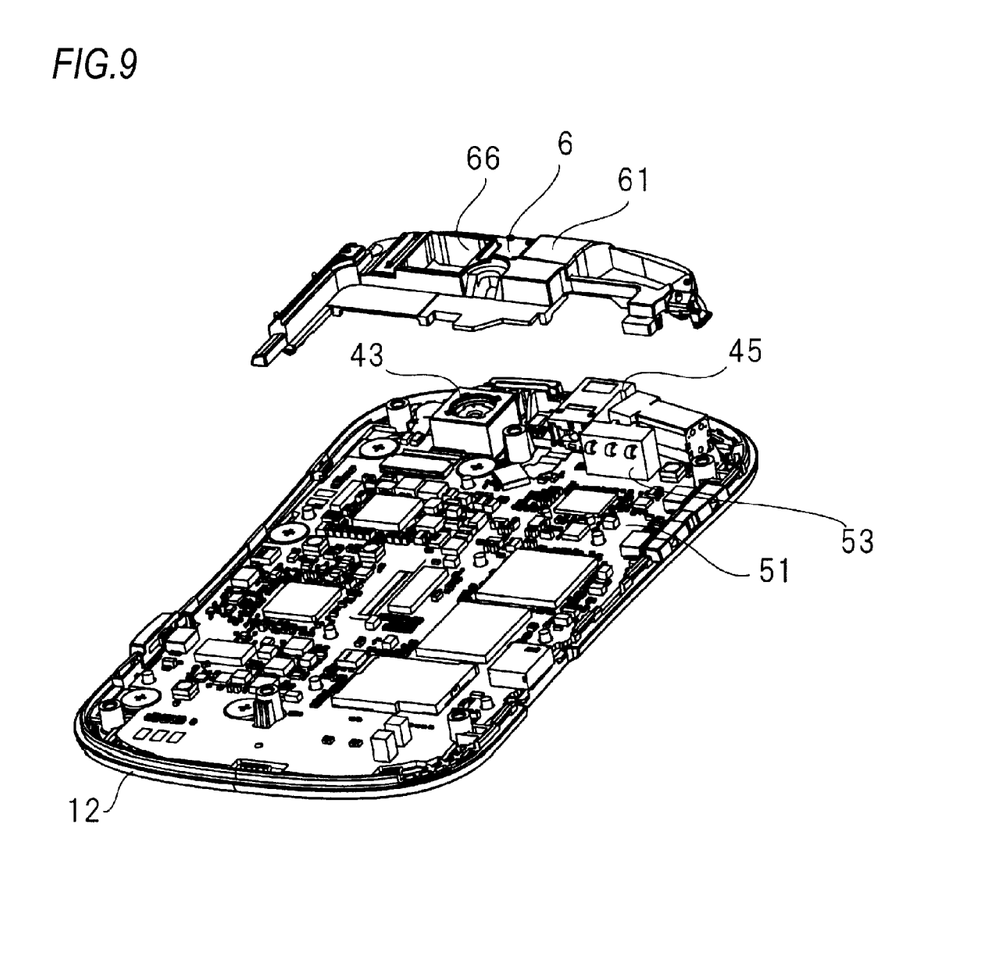
FIG. 9 is an exploded perspective view illustrating the reversed front cabinet and the reversed holder member of FIG. 8.

Further, as shown in FIG. 9, on the surface of the circuit board 51, a terminal component 53 is mounted on the opposite side of the camera 43 with respect to the earphone jack 45, to come into contact with electrodes of a battery (not shown) for supplying power.

Figure 8:
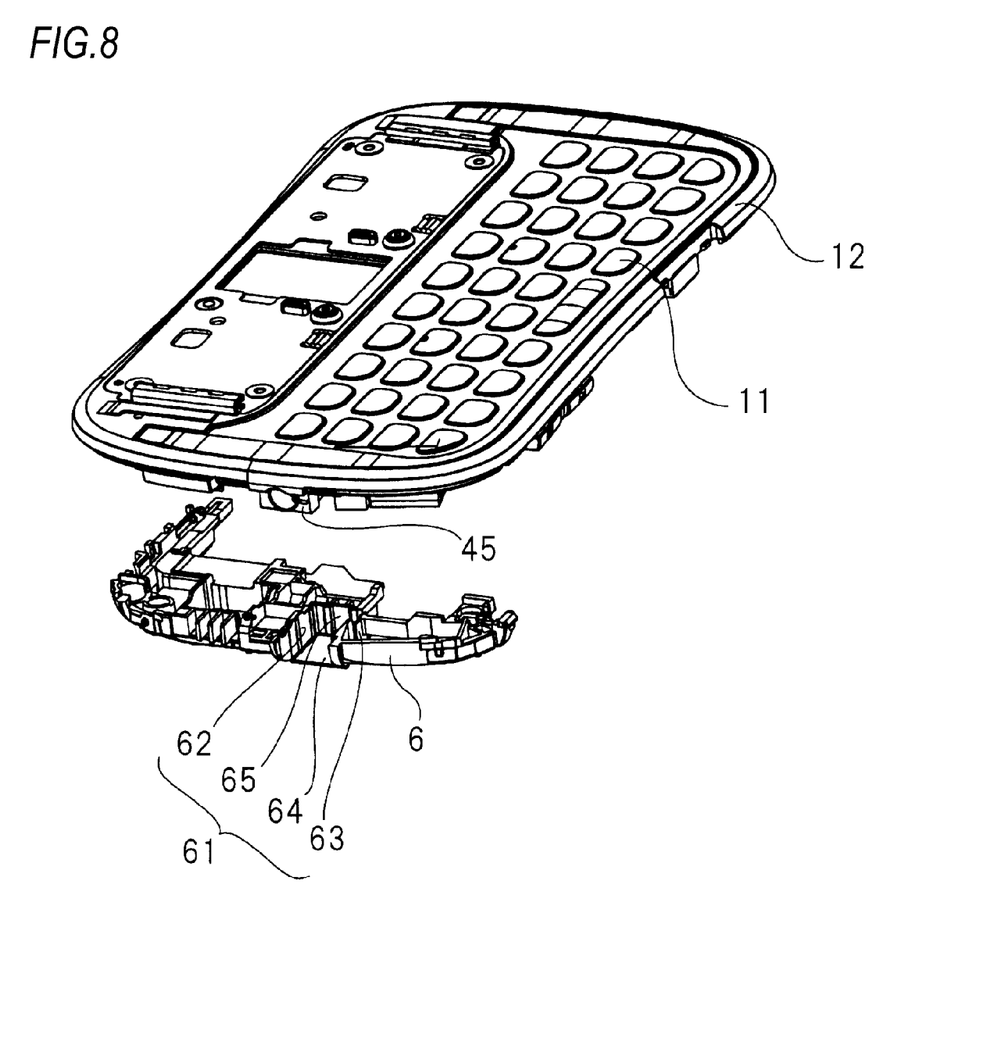
FIG. 8 is an exploded perspective view illustrating a front cabinet and a holder member configuring the first case.

As shown in FIG. 8, the jack holding part 61 of the holder member 6 includes a pair of side-wall ribs 62 and 63 that face to side faces of the earphone jack 45 respectively, an upper-wall rib 64 that faces the upper face of the earphone jack 45, and a rear-wall rib 65 that faces the rear face of the earphone jack 45.

Figure 10:
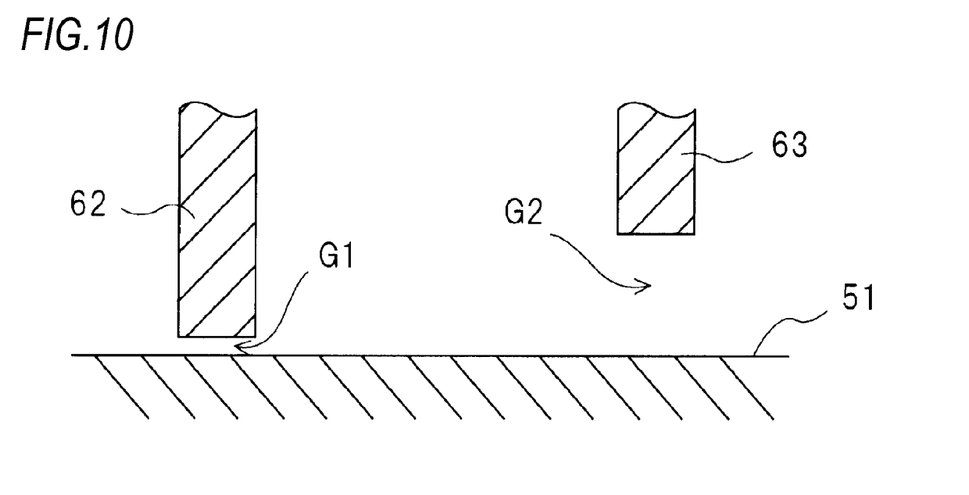
FIG. 10 is a cross-sectional view illustrating magnitude relation between two gap portions.

As shown in FIG. 5, the holder member 6 is disposed on the surface of the circuit board 51 to cover the earphone jack 45, such that the pair of side-wall ribs 62 and 63 protrudes toward the circuit board 51, and gap portions G1 and G2 are formed between the fore end faces of the pair of side-wall ribs 62 and 63 and the surface of the circuit board 51, respectively. The gap portion G1 between one side-wall rib 62 at the camera 43 side and the surface of the circuit board 51 has a small gap of about 0.05 mm, and the gap portion G2 between the other side-wall rib 63 at the terminal component 53 side and the surface of the circuit board 51 has a large gap of about 1 mm to 2 mm (see FIG. 10).

Accordingly, a circumferential wall for surrounding the earphone jack 45 is formed according to the jack holding part 61 of the holder member 6 and the surface of the circuit board 51. At positions of the circumferential wall substantially equal-distant from the jack hole 19, the two gap portions G1 and G2 are formed to pass from the jack hole 19 to the inside of the first case 1.

In a case of using the above-mentioned sliding-type communication terminal, specifically, with the jack hole 19 of the first case 1 directed upward, rain-water may by entered into the earphone jack 45 from the jack hole 19.

In this case, the water entered into the earphone jack 45 is drawn into one gap portion G1 formed by the side-wall rib 62 at the camera 43 side, by a capillary phenomenon. Then, the water may be held in the corresponding gap portion or may be flowed into the first case 1 through the gap portion, according to the amount of water.

Here, the other gap portion G2 formed by the side-wall rib 63 at the terminal component 53 side has the large gap such that the capillary phenomenon unlikely occurs. Therefore, the water is unlikely drawn into the corresponding gap portion.

Here, the shielding plate 50 is formed to be adjacent to the one gap portion, and a rib (not shown) is formed at a side wall of the shielding plate 50. A gap formed between a right side-wall rib of the shielding plate 50 and the face of the circuit board 51 at the side wall of the shielding plate 50, specifically, from a position adjacent to the one gap portion to the camera 43 side (the right side-wall rib of the shielding plate 50 shown in FIG. 7), is designed in a size so as to be capable of drawing water by the capillary phenomenon, similarly to the gap portion G1.

Therefore, the water passed through the one gap portion is drawn into the gap portion formed between the right side-wall rib of the shielding plate 50 and the surface of the circuit board 51 and then flows along the corresponding gap portion.

Accordingly, a flow path is formed on the circuit board 51 so as to bypass the terminal component 53 and a high-voltage circuit unit 52 in the peripheral.

Here, the magnitude relation between the gaps of the one gap portion G1 and the other gap portion G2 is unlikely reversed even if any assembly errors exist in the first case 1. Therefore, the above-mentioned bypassing flow path is always formed, regardless of assembly errors of the first case 1. It has been confirmed by experiments (such as a water infiltration experiment) that water is almost drawn into the one gap, and the bypassing flow path is formed such that the drawn water is transferred from the one gap to the gap portion between the right side-wall rib of the shielding plate 50 and the surface of the circuit board 51 and then flows along the corresponding gap portion as described above.

Therefore, the water entered into the jack hole 19 is unlikely to reach the terminal component 53 and the high-voltage circuit units in the first case 1, and thus occurrence of an electric short circuit in the high-voltage circuit units is suppressed.

Further, if a water absorbing member having large surface area such as a cushion member is disposed in the flow path of the water entered into from the jack hole 19, it is possible to absorb the water entered into the first case 1.

According to the sliding-type communication terminal, it is possible to efficiently suppress an electric short circuit due to infiltration of water into the main body of the sliding-type communication terminal, by actively controlling a infiltration path of water according to a difference between the gaps of the two gap portions G1 and G2, not by configuring a water-resistant structure in the jack holding part 61 surrounding the earphone jack 45.

Further, since the side-wall ribs 62 and 63 for forming the two gap portions G1 and G2 are integrally formed in the holder member 6, the number of components does not increase.

The configuration of each unit of this disclosure is not limited to the above-mentioned embodiment, but may be variously modified. For example, the pair of side-wall ribs 62 and 63 for holding the earphone jack 45 can be formed integrally with the back cabinet 13.

Also, this disclosure is not limited to the earphone jack 45, but may be implemented in various electronic devices (such as an information processing terminal or a portable phone made by a single case) having, for example, USB jacks for inserting USB plugs.

What is claimed is:

1. An electronic device having a jack hole to expose a jack, comprising
    a circumferential wall formed in a case surrounding the jack,
    a pair of side-wall ribs facing side faces of the jack, respectively,
    a part of the circumferential wall being configured by the pair of side-wall ribs,
    two gap portions of the circumferential wall being formed by the pair of side-wall ribs to pass from the jack hole to an interior of the case, and
    one gap of the two gap portions being smaller than another gap of the two gap portions for initially drawing water entering the jack hole to the one gap by capillary action.

2. The electronic device according to claim 1, further comprising
    a circuit board having the jack,
    wherein the two gap portions are respectively formed between fore end surfaces of the side-wall ribs and the surface of the circuit board.

3. The electronic device according to claim 2, further comprising
    a holder member to hold the jack on the circuit board,
    wherein the holder member includes the pair of side-wall ribs, an upper-wall rib that faces an upper face of the jack, and a rear-wall rib that faces a rear face of the jack.

4. The electronic device according to claim 2, further comprising
    a high-voltage circuit unit that is disposed at a position farther distant from the one gap portion than from the another gap portion, on the circuit board.

* * * * *